March 31, 1970    E. R. WHITE ET AL    3,503,151
SEALED FUEL CELL POWER PACK IN COMBINATION WITH A TOY VEHICLE
Filed Nov. 26, 1965    2 Sheets-Sheet 1
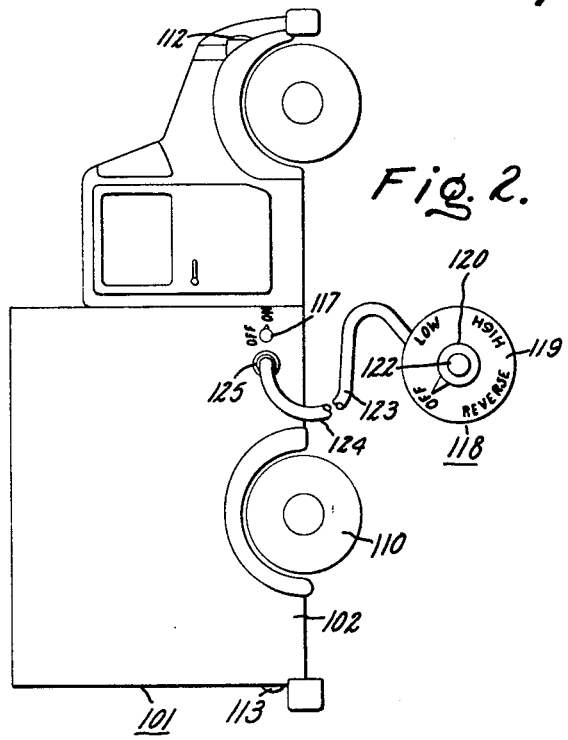
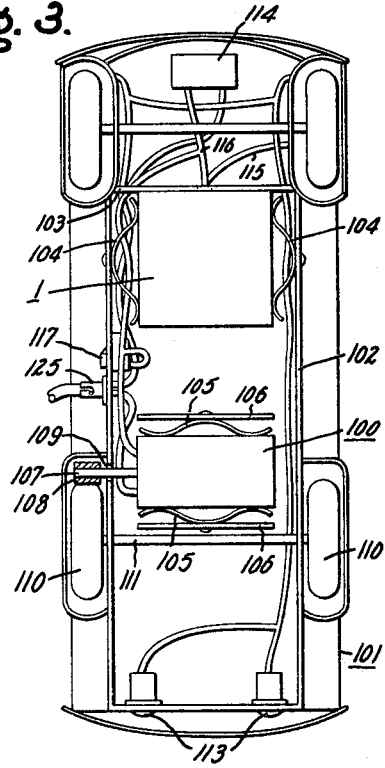
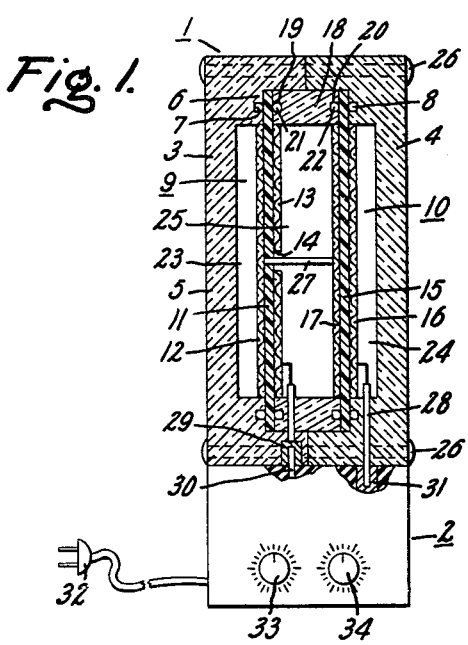
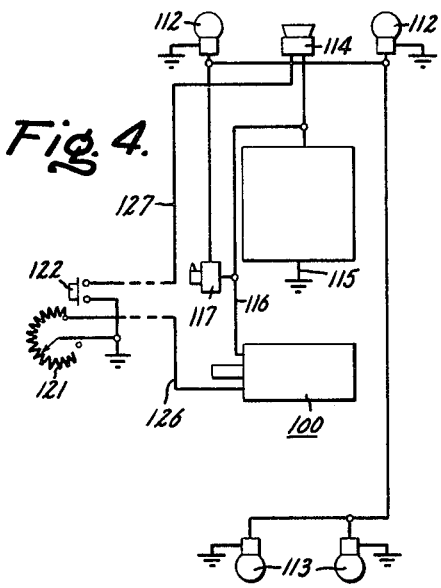
Inventors:
Eugene R. White,
Gene E. Lewis,
by Carl O. Thomas
Their Attorney.

March 31, 1970   E. R. WHITE ET AL   3,503,151
SEALED FUEL CELL POWER PACK IN COMBINATION WITH A TOY VEHICLE
Filed Nov. 26, 1965   2 Sheets-Sheet 2
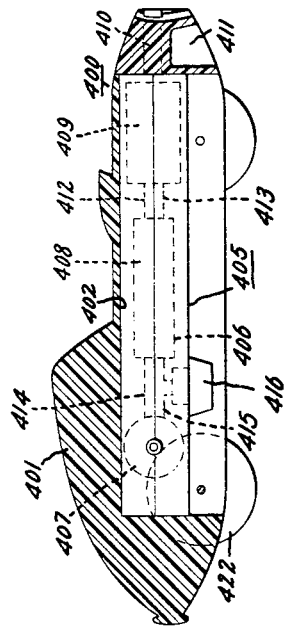
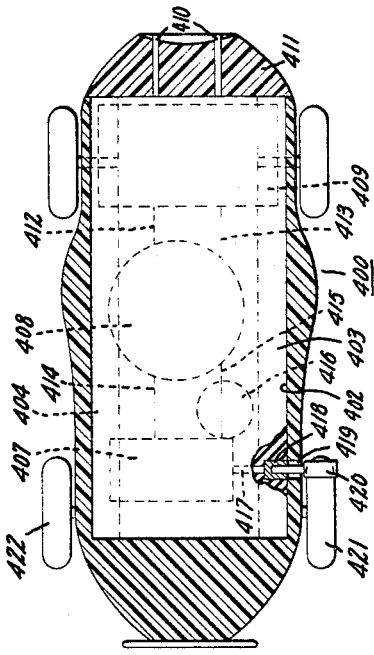
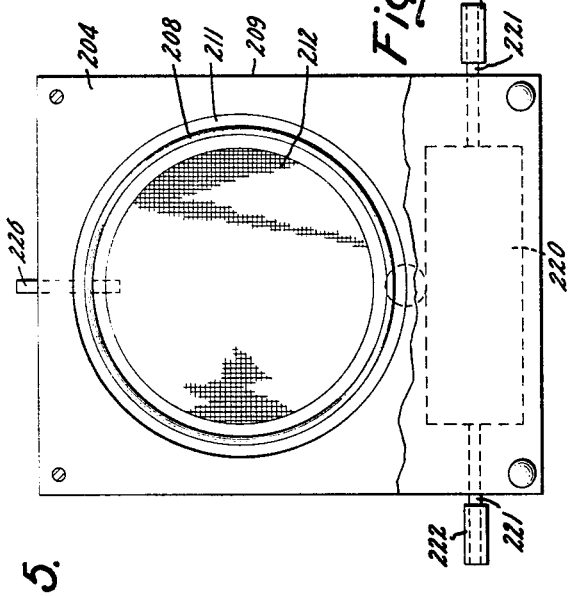
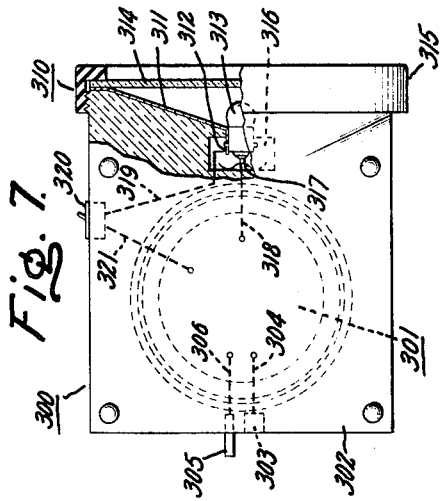
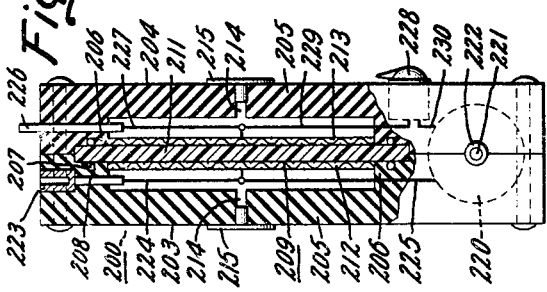
*Inventors:*
*Eugene R. White,*
*Gene E. Lewis,*
*by Carl O. Thomas*
*Their Attorney.*

United States Patent Office 3,503,151
Patented Mar. 31, 1970

3,503,151
SEALED FUEL CELL POWER PACK IN COMBINATION WITH A TOY VEHICLE
Eugene R. White, Topsfield, and Gene E. Lewis, Wenham, Mass., assignors to General Electric Company, a corporation of New York
Filed Nov. 26, 1965, Ser. No. 509,823
Int. Cl. A63h 17/00
U.S. Cl. 46—243                                7 Claims

ABSTRACT OF THE DISCLOSURE

A power pack is disclosed formed by mounting an electrolyte element, such as an ion exchange membrane, in a casing so as to form two sealed chambers. An electrode is mounted by the electrolyte element in each chamber. Initially one of the chambers contains water, and the casing is formed of transparent material so that the water within the chamber can be seen. Hydrogen is formed in one chamber of the power pack and oxygen in the remaining chamber by electrolyzing the water in the electrolyte element in the one chamber. The source of direct current to perform the electrolysis may be an AC-DC converter. With hydrogen and oxygen in the chambers of the power pack it may be utilized to operate a toy, lamp, or other device merely by connecting the power pack to electrical terminals thereof. In another form the device to be operated by the electrical output may be totally or partially formed integrally with the power pack casing.

In a specific toy construction, a DC motor and a power pack are mounted in a toy vehicle. An external control unit is removably connected to the toy vehicle so that the speed of the DC motor may be externally controlled. The vehicle is also provided with lights and externally controlled horn.

Our invention relates to a new combination for converting electrical energy of alternating potential into differing energy forms to achieve an amusing and/or utilitarian result.

In its simplest form, our invention is comprised of the combination of an AC-DC converter, a fuel cell power pack, and a toy capable of utilizing electrical energy in the performance of amusing and/or useful functions. The fuel cell power pack is comprised of a housing sealingly enclosing a chamber. At least one fuel cell lies within the chamber sealed against the housing and dividing the chamber into an oxygen compartment and a hydrogen compartment. Each fuel cell is comprised of an electrolyte means having first and second faces adjacent the oxygen and hydrogen compartments, respectively, and a gas permeable electrode adjacent each face. The power pack includes means for transferring electrical energy from the fuel cell electrodes.

Our invention may be better understood with reference to the following detailed description considered in conjunction with the drawings in which:

FIGURE 1 is an elevation, partly in section, of an AC-DC converter and a fuel cell power pack;
FIGURE 2 is an elevation of a toy;
FIGURE 3 is a bottom view of the toy shown in FIGURE 2;
FIGURE 4 is a schematic circuit diagram of the toy shown in FIGURE 2;
FIGURE 5 is a side elevation, partly in section, of a composite fuel cell power pack;
FIGURE 6 is a front elevation, with parts broken away, of the composite fuel cell power pack shown in FIGURE 5;
FIGURE 7 is an elevation of an alternate composite fuel cell power pack;
FIGURE 8 is a vertical section of another toy; and
FIGURE 9 is a horizontal section of the toy shown in FIGURE 8.

In FIGURE 1 is shown the combination of a fuel cell power pack 1 and an AC-DC converter 2. The fuel cell power pack as shown is comprised of casing elements 3 and 4. Each of the casing elements includes a circular face wall portion 5 of reduced thickness and an annular shoulder 6 surrounding the face wall portion. An annular groove 7 is provided in each of the shoulders 6. An O-ring seal 8 is mounted in each of the grooves. Mounted adjacent the annular shoulder of the casing element 3 is a fuel cell 9. A similar fuel cell 10 is mounted adjacent the annular shoulder of the casing element 4.

The fuel cell 9 consists of an electrolyte element 11, a gas permeable electrode 12 adjacent the outer face of the electrolyte element, and a gas permeable electrode 13 adjacent the inner face of the electrolyte element. The electrode 13 is provided with an aperture 14. The fuel cell 10 consists of an electrolyte element 15, a gas permeable electrode 16 adjacent the outer surface of the electrolyte element, and a gas premeable electrode 17 adjacent the inner surface of the electrolyte element. The electrolyte elements of the cells are preferably formed of ion exchange resin. The electrolyte means may alternately include a solid ion exchange material bonded in an inert matrix. Additionally, the electrolyte elements may be formed of a solid, porous matrix having liquid electrolyte contained in the pores thereof. The electrodes are formed of electrocatalyst pressed against the faces of the electrolyte means, preferably associated with a current collector. A particularly suitable electrode structure is disclosed by Niedrach in Patent No. 3,134,697.

As shown in FIGURE 1, the fuel cell power pack is mounted on an AC-DC converter 2. The converter is provided with a male terminal 30 cooperating with power pack female terminal 29 and female terminal 31 cooperating with power pack male terminal 28. As shown, the converter is equipped with a jack 32 for connection with a 110 volt AC wall outlet. The specific converter shown is provided with a control 33 for permitting high rate current delivery to the power pack if desired. Control 34 allows a low rate of DC current supply to the power pack to be adjusted. The specific circuitry of the converter forms no part of our invention. One of a variety of suitable converter circuit arrangements is disclosed on pages 92 and 93 of the General Electric Company's Silicon Controlled Rectifier Manual, 2nd edition.

The fuel cells 9 and 10 are held in spaced relation between the casing elements by an annular spacing ring 18. The ring includes grooves 19 and 20 adjacent the fuel cells 9 and 10, respectively. O-ring seals 21 and 22 are mounted in the respective grooves.

The casing elements 3 and 4 together with the spacing ring 18 form a housing for the fuel cell power pack having an interior chamber. The fuel cells 9 and 10 divide the chamber into two outer, identical reactant compartments 23 and 24 and a central reactant compartment 25. Hydogen may be contained in the outer compartments and oxygen in the inner compartment or vice versa. The O-rings cooperate with the electrolyte elements to prevent mixing of reactants. Tie-bolt units 26 hold the parts in tight, sealing relation.

The fuel cells 9 and 10 are connected in series by a conductor 27 which extends through the electrolyte element 11 and the aperture 14 in the electrode 13 to electrically connect electrodes 12 and 17. Terminals for the fuel cell power pack are provided by a male connector 28 extending through casing element 4 and electrically connected to electrode 16 and a female connector 29 embedded in casing element 3, extending inwardly through annular ring 18, and connected to electrode 13.

The elements of the fuel cell power pack 1 may be fabricated according to techniques well understood by those skilled in the art. Assuming for purposes of illustration that compartments 23 and 24 are to serve as oxygen compartments, compartment 25 as a hydrogen compartment, and that cation ion exchange membranes are to be employed, casing 3 is placed on a substantially horizontal surface with the shoulder 6 facing upwardly. Water is then placed in the casing. Next the spacing ring 18 with the fuel cells 9 and 10 attached is laid on the shoulder 6 of casing 3. The casing 4 is then similarly provided with water and the fuel cells, spacing ring, and casing handled as a subassembly is placed on the shoulder 6 of the casing 4. Tiebolts 26 are then placed in position and tightened to hold the power pack assembled.

When the power pack 1 is placed for charge on the converter 2, the water in the compartments 23 and 24 is electrolyzed so that oxygen is formed in these compartments while hydrogen is evolved in compartment 25. Any oxygen which may have been initially trapped in the compartment 25 reacts with hydrogen ions at the electrodes 13 and 17 to form water. This water may be assimilated by the ion exchange membranes and made available to the oxygen electrodes 12 and 16 upon continued charging. By looking through the transparent face portions 5, it can be visually detected when the free water in the compartments has been substantially depleted and the power pack is ready for use. Of course, it is not necessary to deplete the free water in the power pack in order to obtain electrical energy. It is only necessary that some free oxygen and some free hydrogen be present in the compartments for the power pack to function. In using anion exchange membranes the operation differs only in that hydrogen will be formed in the water containing compartment or compartments and oxygen will be formed in the remaining compartment or compartments.

FIGURES 2–4 inclusive illustrate the combinations of a fuel cell power pack 1, a DC motor unit 100, and a toy 101 useful therewith. As shown, the toy is provided with an electrically conductive body 102. An insulative connector strip 103 is attached to the body. The connector strip is provided with male and female connectors, now shown, for connection to the fuel cell power pack. The power pack is also held in position by springs 104 mounted on the body.

The DC motor unit 100 is held in position on the body by springs 105 attached to walls 106 connected to the body. The motor unit includes a rotatable shaft 107 having an adaptor bushing 108 fitted thereto. The shaft extends through a slot 109 in the body. The bushing lies in contact with a wheel 110. This wheel is connected for rotation with an identical wheel on the opposite side of the body by an axle 111.

The toy is provided with two head lamps 112, two tail lamps 113, and a horn 114. One terminal of the fuel cell power pack is grounded to the conductive body through lead 115. Conductive means 116 is provided which electrically connects a terminal of each of the DC motor unit, lamps, and horn in parallel to the remaining terminal of the power pack. The conductive means 116 includes a switch 117 whereby the connection to the electric lamps of the toy may be selectively opened or closed. The electric lamps are each grounded to the conductive body through the base portions.

A control unit 118 is mounted exterior of the toy to control actuation of the DC motor unit and horn. The control unit is comprised of a housing 119 providing a dial face. A dial 120 mounted adjacent the dial face is physically connected to a rheostat 121 laying within the housing. Note that the rheostat includes a setting for opening the circuit to ground. Mounted centrally of the dial is a horn button 122.

The control unit is attatched to the body of the toy by a control cable 123. The cable is preferably provided with conductive exterior casing 124 to provide a ground between the body and control unit. The control cable is releasably attached to the conductive body by a J-slot connector 125 mounted on the body of the toy. Insulated conducting means 126 extends from the DC motor unit to the rheostat in the control unit. Another insulating conducting means 127 extends from the ground terminal of the horn to the horn button of the control unit.

To operate the toy 101, the control cable 123 is initially released from the J-slot connector 125. The toy is then turned upside down as shown in FIGURE 3. The fuel cell power pack 1 is removed from the AC-DC converter 2 and placed in the toy between the springs 104 and in terminal receiving relation with terminal strip 103. Next, the DC motor unit is placed in the toy between springs 105 so that the adapter bushing 108 fits snugly against wheel 110.

At this point, the toy is set on a substantially horizontal surface wheels down, and the control cable is attached to the body of the toy through J-slot connector 125. The lamp switch 117 is then turned to the on position, if desired. The dial on the control unit is then moved clockwise until the toy is moving at the desired rate of speed. When it is desired to remove people, animals, or toys from the path of the toy 100, it is merely necessary to depress the horn button 122, thereby actuating horn 114. Should the hydrogen and oxygen supply within the fuel cell power pack at any time become depleted, it is only necessary to place the power pack on the converter 2, as shown in FIGURE 1. The water formed as a reaction product within the fuel cell power pack will be quickly electrolyzed by the converter so that the hydrogen and oxygen are regenerated in proper compartments of the power pack. Obtaining the correct polarity connections at the converter is assured by the use of male and female terminal elements, so that polarity reversal is unlikely.

One of the outstanding advantages of the combination as shown in FIGURES 2–4 inclusive is that only one fuel cell power pack, one DC motor unit, and one control unit with control cable is required to operate an entire fleet of toys formed to receive these elements. Further, certain toys may not require a DC motor unit or a control unit. In such units, it may be desirable to utilize the fuel cell power pack without the other units.

FIGURES 5 and 6 illustrate a composite fuel cell power pack 200. The composite power pack is comprised of a housing formed by casing elements 203 and 204. Each of the casing elements includes a circular face wall portion 205 of reduced thickness and an annular shoulder 206 surrounding the face wall portion. An annular groove 207 is provided in each of the shoulders. An O-ring seal 208 is mounted in each of the grooves. Mounted between the opposed shoulders of the casing elements 203 and 204 is a fuel cell 209. The fuel cell consists of an electrolyte element 211 and gas permeable electrodes 212 and 213 adjacent each of two opposed faces of the electrolyte element.

Ports 214 are provided in each of the circular face wall portions. A pressure relief plug 215 is placed in each of the ports. Two plugs are provided because the fuel cell divides the space between the wall portions 205 into separate oxygen and hydrogen compartments.

Mounted in the composite power pack spaced from the fuel cell is a DC motor unit 220. A shaft 221 extends through the motor unit and beyond the housing on each of two opposite sides. An adaptor bushing 222 is mounted on each end of the shaft.

Embedded in casing element 203 is a female connector 223. An electrical lead 224 connects the female connector to electrode 212. An electrical lead 225 connects the DC motor to the electrode 212. A male connector 226 is provided in the casing element 204 and is attached to electrode 213 by electrical lead 227. A switch 228 is mounted in the casing element 204 and is connected to electrode 213 by electrical lead 229. A lead 230 extends from the switch to the remaining terminal of the DC motor.

In use, the composite fuel cell power pack is charged by connection to the converter 2 similarly as fuel cell power pack 1. For use as a toy, wheels may be mounted over or in place of adaptor bushings 222. After the composite power pack has been placed on a relatively horizontal surface, the switch 228 is turned to close the circuit between the DC motor and fuel cell. The wheels will then pull the composite power pack along with one end trailing. The composite power pack could also be used to rotate a propellor or to rotate a gear or gear train. It is appreciated that no more than ordinary mechanical skill would be involved in modifying the stucture of toy 101 for mounting of the composite power pack 200 therein instead of separate fuel cell power pack 1 and DC motor unit 100.

To illustrate the diversity of our invention, FIGURE 7 shows an alternate composite fuel cell power pack 300. The alternate power pack incorporates a fuel cell 301 similar to fuel cell 209 mounted in a housing 302. A female connector 303 is mounted in the housing connected to one electrode of the fuel cell through lead 304. A male connector 305 is connected to a remaining fuel cell electrode by lead 306. The connectors 303 and 305 allow charging of the composite power pack by the conveyor 2.

The composite power pack includes a lamp unit 310 mounted in the housing. The elements of the lamp unit are comprised of conductive reflector 311 having a socket 314 centrally positioned. A bulb 313 is received in the socket. A transparent protective shield 314 overlies the reflector and bulb. An annular coupling ring 315 attaches the reflector and shield to the housing of the power pack. The housing is provided with a recess 316 rearwardly of the bulb in which a conductive spring 317 is positioned. The spring provides an electrical connection to the central terminal of the bulb. An electrical lead 318 extends from the spring to one electrode of the fuel cell while a second electrical lead 319 extends from the reflector to a switch 320. An electrical lead 321 extends from the switch to a remaining electrode of the fuel cell.

The composite fuel cell power pack 300 is normally stored connected to the converter 2. When it is desired to use the power pack for any purpose, the composite power pack is removed from the converter and the switch actuated to close the circuit between the bulb and the fuel cell.

FIGURES 7 and 8 illustrate still another form of our invention. A toy 400 is formed of a unitary body 401. The body includes a recess 402 open on the front and bottom sides. The body provides spaced ledges 403 and 404 positioned ajacent the lower edges of the recess. A composite fuel cell power pack 405 is removably mounted in the recess and supported by the ledges. The composite power pack includes within a housing 406 a DC motor 407, a fuel cell unit 408, and an AC-DC converter 409. Spaced terminal jacks 410 extend from the converter exterior of the housing. A protector 411 is mounted on the terminal jacks. The fuel cell unit is connected to the converter by leads 412 and 413. The DC motor is connected to the fuel cell unit by lead 414 and by a lead 415 controlled by switch 416.

The DC motor unit is provided with a shaft 417 having a female coupling 418 attached to its outer end. Non-rotatably splined to the female coupling is a drive pin 419 having an adaptor bushing 420 on its outer end. The adaptor bushing engages the periphery of a wheel 421 of the toy. A second wheel 422 of the toy is connected to wheel 421 for rotation therewith by axle 423.

In use, a toy body 401 is selected from any one of a variety of differently styled but structurally similar bodies. A composite fuel cell power pack 405 is charged by plugging terminal jacks 410 into a standard 110 volt wall outlet. The AC-DC converter 409 converts the 110 volt AC current into DC current and supplies this as a charging current to the fuel cell unit 408 through leads 412 and 413. If the housing 416 is formed of a transparent material, the point of complete charging can be determined by noting the disappearance of free liquid from the fuel cell unit. If the housing is not formed of transparent material, complete charging can be estimated by timing the duration of charging.

When the composite power pack has received the desired degree of charge on the fuel cell unit, it is removed from the wall outlet and placed in the recess 402 of the toy body. Next, the drive pin 419 is inserted in the female coupling 418. The protector 411 is placed on the terminal jacks, if desired. The toy is placed on an approximately horizontal surface and the switch 416 is turned to close the circuit between the DC motor 407 and the fuel cell unit 408. At this point, the toy will propel itself forward.

While our invention is described with reference to certain preferred embodiments, it is appreciated that numerous modifications will be obvious to those skilled in the art. For example, while power packs have been shown having one and two fuel cells therein, a power pack could incorporate any desired number of fuel cells connected either in series or in parallel. Also, while the invention has been described with reference to an AC-DC converter capable of converting 110 volt AC into DC, it is appreciated that any converting capable of taking electricity in any form, such as DC, pulsating DC, or AC of differing voltage and frequency, and delivering approximately 1.5 volts per fuel cell DC would be useful. While composite power packs are shown incorporating a DC motor and a lamp, it is appreciated that other electrically operable elements could be included in a composite power pack. The DC motor and lamp are shown mounted in the composite power packs spaced from the edge of the fuel cell, however, these elements could be mounted adjacent a face of the fuel cell, if desired. It is further anticipated that a plurality of electrical devices of like or differing character could be incorporated in a composite power pack. Finally, while the invention has been described with reference to only a few toys, it is appreciated that a wide variety of toys are useful with the power packs shown. The DC motor shaft could be provided, for example, with a gear to mesh with a gear in any toy in which mechanical motion is desired. Alternately, the power pack could contact electrical terminals in any toy in which electrical energy is desired.

It is accordingly intended that the scope of our invention be determined by reference to the following claims.

What we claim as new and desire to secure by Letters Patent of the United States is:

1. The combination of a sealed, unitary power pack including a fuel cell consisting of:
 (a) an electrolyte element, and
 (b) first and second electrodes mounted on said electrolyte element,
 (c) casing means cooperating with said electrolyte element to form a first sealed chamber adjacent said first electrode and a second sealed chamber adjacent said second electrode,
 (d) first and second terminal means providing an electronically conductive connection between said first and second electrodes, respectively, and the exterior of said casing means,
 (e) a self-contained, reversible, source of reactant for said power pack to permit operation with a toy including free water present in one of the sealed chambers, which is adapted to be dissociated to form the gaseous reactants for said fuel cell, and at least a portion of said casing means adjacent the water containing chamber being transparent and,
 (f) toy means adapted to utilize electrical energy cooperating with said first and second terminal means.

2. The combination according to claim 1 in which said power pack additionally includes a converter.

3. A vehicular toy comprised of:
(a) a body,
(b) a power pack supported by said body including a fuel cell, said fuel cell including a sealed outer casing and a self-contained reversible source of reactant for said fuel cell in the form of free water present in said sealed casing,
(c) a DC motor supported by said body,
(d) means electrically connecting said fuel cell and said DC motor,
(e) means supporting said body including at least one wheel rotatably attached to said body, and
(f) drive means extending between said DC motor and said wheels.

4. A vehicular toy according to claim 3 in which said DC motor is integrally included in said power pack.

5. A vehicular toy as described in claim 3 wherein said power pack includes a converter to dissociate any water formed during operation of the fuel cell as a power source, into oxygen and hydrogen to furnish gaseous reactants for said fuel cell for further operation thereof as a power source.

6. A vehicular toy including,
(a) a body having a recess therein,
(b) means supporting said body including at least one wheel rotatably attached to said body,
(c) a housing releasably supported within said recess, said housing sealingly enclosing a chamber,
(d) a fuel cell mounted within said chamber consisting of an electrolyte element having first and second opposed faces sealed to said housing separating said chamber into a hydrogen compartment and an oxygen compartment, and
(e) a self-contained source of reactant for said power pack to permit operation with a toy including free water in one of the sealed chambers which is adapted to be dissociated to form the gaseous reactants for said fuel cell, and
(f) electrode means mounted on said first and second faces,
(g) a DC motor mounted by said housing spaced from said fuel cell and said chamber,
(h) means electrically connecting said fuel cell and said motor including a circuit control means, and
(i) means providing a motive connection between said wheel and said DC motor.

7. A vehicular toy according to claim 6 additionally including a converter mounted in said housing and electrically connected to said fuel cell to dissociate any water formed during operation of the fuel cell as a power source into oxygen and hydrogen to furnish gaseous reactants for said fuel cell for further operation thereof as a power source.

References Cited

UNITED STATES PATENTS

| | | | |
|---|---|---|---|
| 2,832,177 | 4/1958 | Mueller | 46—244 |
| 3,134,697 | 5/1964 | Niedrach | 136—86 |
| 3,219,486 | 11/1965 | Gumucio | 136—86 |

F. BARRY SHAY, Primary Examiner

R. F. CUTTING, Assistant Examiner

U.S. Cl. X.R.

136—86